United States Patent [19]

Hackley

[11] Patent Number: 4,653,172
[45] Date of Patent: Mar. 31, 1987

[54] AXIAL CLAMP FOR NUCLEAR REACTOR HEAD PENETRATION CONOSEAL JOINTS

[75] Inventor: Thomas A. Hackley, Jeannette, Pa.

[73] Assignee: Westinghouse Electric Corp., Pittsburgh, Pa.

[21] Appl. No.: 698,336

[22] Filed: Feb. 5, 1985

[51] Int. Cl.⁴ .................. B23P 19/00; F16L 35/00; F16L 17/00
[52] U.S. Cl. ........................... 29/526 R; 285/18; 285/340
[58] Field of Search .............. 285/340, 351, 18; 29/526 R

[56] References Cited

U.S. PATENT DOCUMENTS

| | | | |
|---|---|---|---|
| 1,925,937 | 9/1933 | Schultis | 235/120 |
| 2,321,597 | 6/1943 | Hobbs | 251/50 |
| 2,532,632 | 12/1950 | MacArthur | 285/146 |
| 2,661,965 | 12/1953 | Parmesan | 285/122 |
| 2,958,548 | 11/1960 | de Vienne et al. | 285/158 |
| 3,015,500 | 1/1962 | Barnett | 285/47 |
| 3,104,121 | 9/1963 | Nordin et al. | 285/332.3 |
| 3,266,821 | 8/1966 | Safford | 285/40 |
| 3,273,918 | 9/1966 | Legarra et al. | 285/332.3 |
| 3,521,909 | 7/1970 | Brown | 285/3 |
| 3,625,552 | 12/1971 | Mahoff et al. | 285/340 |
| 3,697,102 | 10/1972 | Falke | 285/340 |
| 3,767,216 | 10/1973 | Martin | 285/340 |
| 3,776,577 | 12/1973 | Dickey | 285/31 |
| 3,985,379 | 10/1976 | Normark | 285/340 |
| 4,150,477 | 4/1979 | Orr | 285/18 |
| 4,264,054 | 4/1981 | Morrill | 285/340 |
| 4,402,773 | 9/1983 | Morrill | 285/340 |
| 4,438,959 | 3/1984 | Valentine | 285/18 |
| 4,478,439 | 10/1984 | Arnold | 285/340 |

Primary Examiner—Howard N. Goldberg
Assistant Examiner—Steven Nichols
Attorney, Agent, or Firm—Daniel C. Abeles

[57] ABSTRACT

A method for forming a sealed coupling between two bodies each body presenting an abutment surface. The respective bodies are arranged so that their respective abutment surfaces are axially adjacent one another, defining a space therebetween in which a deformable gasket is disposed. An axial external force is applied to the bodies for compressing the abutment surfaces together against the gasket to form a seal between the bodies. The bodies are immobilized relative to one another while the external force is being applied to the bodies so that sufficient compression will be maintained by the abutment surfaces to preserve the integrity of the seal when the external axial force is withdrawn. The external axial force is then withdrawn, leaving the two bodies coupled together via the seal.

1 Claim, 6 Drawing Figures

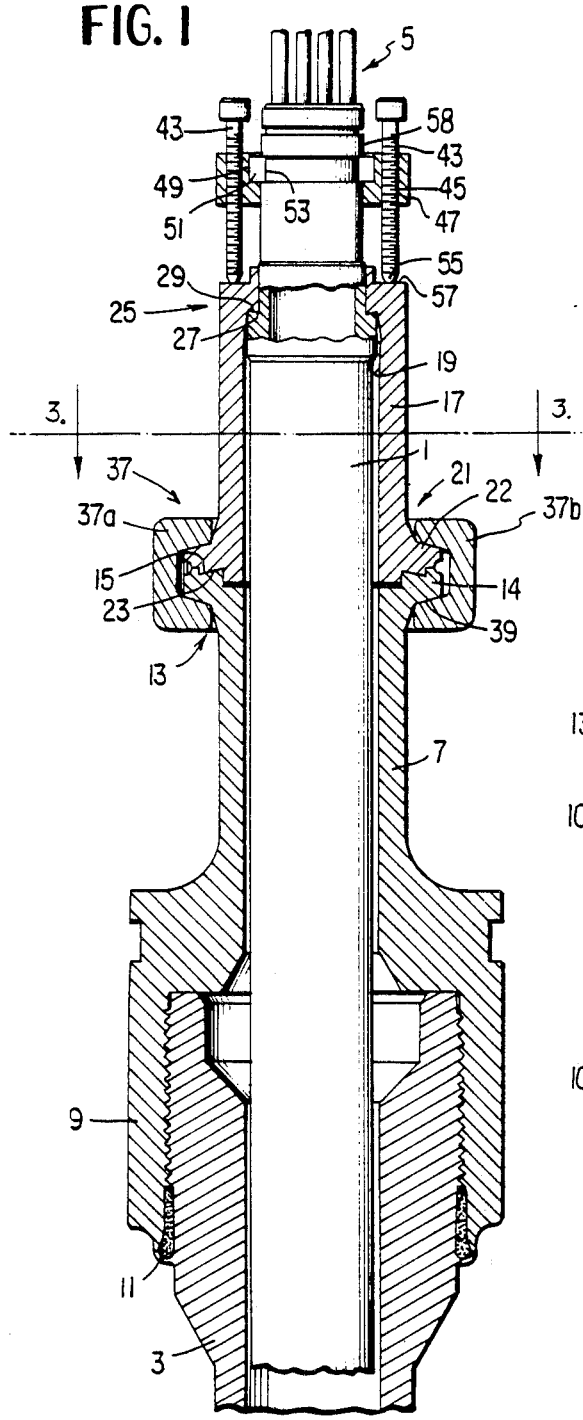
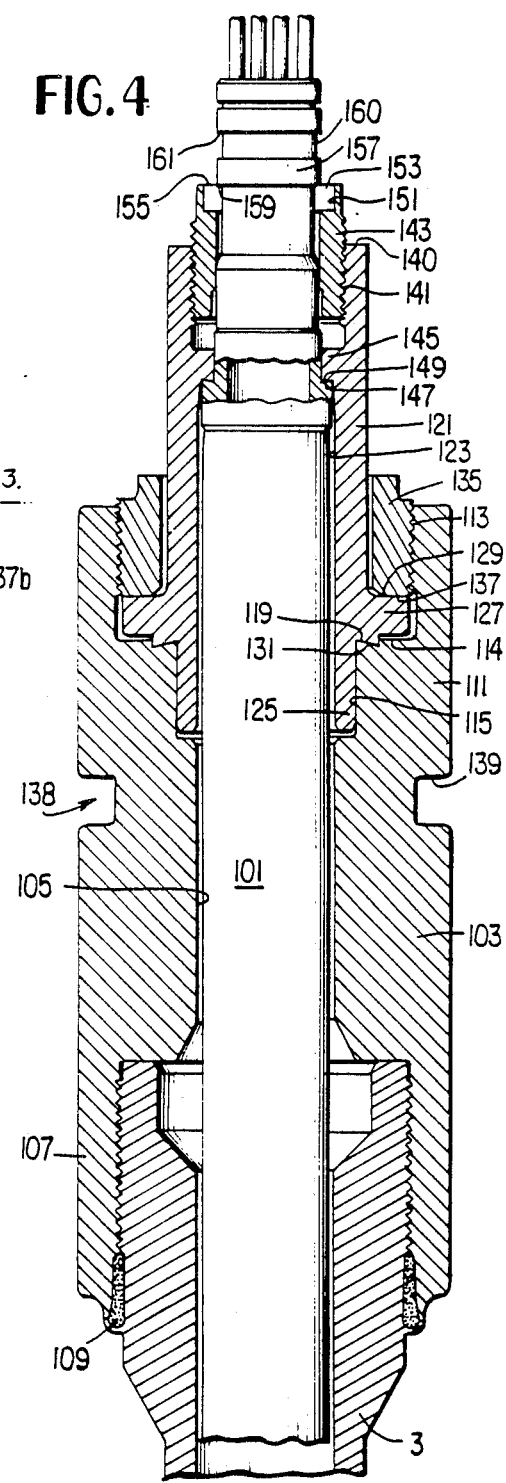

AXIAL CLAMP FOR NUCLEAR REACTOR HEAD PENETRATION CONOSEAL JOINTS

BACKGROUND OF THE INVENTION

1. Field of the Invention

The invention relates to a method for forming a sealed coupling between two bodies, and more particularly to a method for releasably sealing a pipe to a body through which the pipe penetrates. The invention is particularly useful in a nuclear reactor for sealing the thermocouple columns with respect to the nuclear reactor closure head which is penetrated by the thermocouple columns.

2. Description of the Prior Art

In a nuclear reactor, such as a pressurized water nuclear reactor, the closure head of the reactor vessel is penetrated by a plurality of thermocouple columns. Various electrical leads and control mechanisms pass through the thermocouple columns from the exterior of the vessel to the interior of the vessel where they are connected with control apparatus within the vessel. Because the reactor vessel is pressurized during operation, it is necessary that the penetrations of the thermocouple columns through the closure head be sealed in order to prevent any leakage through these penetrations. Further, because the reactor closure head is periodically removed during the life of the reactor, for example for refueling and other service operations, the seal between each thermocouple column and its penetration cannot be permanent; rather such seal must be capable of being released and re-formed relatively quickly so as not to impede the removal and replacement of the reactor closure head.

In a known method of sealing a thermocouple column with respect to the reactor closure head, a female flange is permanently welded to the structure forming the vessel head penetration for each thermocouple column. The end of the female flange remote from the closure head is provided with a shoulder having an abutment surface. The thermocouple column passes through the closure head penetration as well as the associated female flange. A male flange, through which the thermocouple column also passes, is likewise provided with a shoulder which has an abutment surface in mating relationship in the axial direction with the abutment surface of the female flange. A metal deformable gasket is placed between the mating abutment surfaces. The shoulders of the male and female flanges present an outer contour having a frustro-conical section. A segmented yoke having an inner circumferential recess with a frustro-conical section fits about the shoulders of the mating flanges and is provided with tangentially oriented bolts which when tightened cause the yoke to pinch together the shoulders and hence the adjacent abutment surfaces of the male and female flanges, compressing the gasket and forming a metal to metal seal between the male and female flanges.

A similar seal is formed between an abutment surface provided on the outer surface of the thermocouple column and an adjacent abutment surface provided at the other end of the male flange. In this latter seal, however, the abutment surfaces are brought together to compress the metal gasket by an axial force which is provided by axially oriented bolts which are arranged to compress the adjacent abutment surfaces together as the bolts are tightened.

The seals formed by the foregoing method, like other mechanical seals, deteriorate over a period of time and begin leaking. Leakage through the seals formed by the foregoing method can be temporarily stopped by further tightening the tangentially oriented bolts around the segmented yoke in the case of the seal between the male and female flanges, and further tightening the axially oriented bolts in the case of the seal between the thermocouple column and the male flange.

SUMMARY OF THE INVENTION

It is an object of the present invention to provide a method for forming an improved seal of the above described type which is less prone to leakage over time and which thus requires less maintenance.

The above and other objects are accomplished in accordance with the invention which provides a method for forming a sealed coupling between two bodies wherein each body presents an abutment surface and the respective bodies are arranged so that the respective abutment surfaces are axially adjacent one another, defining a space therebetween, and wherein a deformable gasket is disposed within the space. The method includes applying an external axial force to the bodies for compressing the abutment surfaces together against the gasket to form a seal between the bodies: immobilizing the bodies relative to one another while the external axial force is being applied to the body so that sufficient compression will be maintained by the abutment surfaces to preserve the integrity of the seal when the external axial force is withdrawn; and withdrawing the external axial force applied to the bodies, leaving the two bodies coupled together via the seal.

In a further aspect of the invention a method is provided for sealing a pipe to a body having an aperture through which the pipe penetrates the body in an arrangement wherein the pipe has an outer surface provided with a first annular abutment surface. The arrangement additionally includes a first member having an annular opening penetrated by the pipe and opposite axial end portions, one axial end portion including a second annular abutment surface and the other axial end portion being permanently sealed to the body so that the annular opening of the first member is coaxial with respect to the aperture of the body; a second member having an annular opening penetrated by the pipe, inner and outer axial surfaces and opposite axial end portions, a third annular abutment surface being provided at the outer axial surface at the one axial end portion of the second member and a fourth annular abutment surface being provided at the inner axial surface at the other axial end portion of the second member, the third annular abutment surface being axially adjacent the second annular abutment surface and the fourth annular abutment surface being axially adjacent the first annular abutment surface, the second and third annular abutment surfaces defining a first annular space therebetween and the first and fourth annular abutment surfaces defining a second annular space therebetween; and first and second deformable annular gaskets each located in a respective one of the first and second annular spaces. The method includes applying a first external axial force to the first and second members for compressing the second and third annular abutment surfaces together against the gasket to form a first seal; immobilizing the first and second members relative to one another while the first external axial force is being applied so that sufficient compression will be maintained by the second and third annular abutment surfaces to preserve the integrity of the first seal when the first external axial force is withdrawn; withdrawing the first external axial force, leaving the first and second members coupled together via the first seal; applying a second external axial force to the second member and the pipe for compressing the first and fourth annular abutment surfaces together against the second annular gasket to form a second seal; immobilizing the second member and the pipe relative to one another while the second external axial force is being applied so that sufficient compression will be maintained by the first and fourth annular abutment surfaces to preserve the integrity of the second seal when the second external axial force is withdrawn; and withdrawing the second external axial force, leaving the second member and the pipe coupled together via the second seal.

The axial force may be applied in accordance with the invention by any suitable means, such as a hydraulic mechanism. Gripper grooves and/or bearing surfaces for engagement by the hydraulic mechanism or other axial force applying devices may be provided in a respective one of the bodies or members which contain the annular abutment surfaces that are being compressed together.

By immobilizing the members relative to one another by means of, for example, a locknut which can be hand tightened, it is possible to remove the externally applied axial force and yet retain sufficient axial compression for maintaining the integrity of the seal.

It has been found that a seal formed in accordance with the method of the invention can last for a longer time without leakage and thus requires less maintenance than a similar seal formed by known methods.

Further, the sealed coupling can be easily released by simply re-applying the external axial force and backing off the locknut. To re-seal the members, a new deformable gasket is placed between the abutment surfaces and the method of sealing according to the invention as described above is repeated.

BRIEF DESCRIPTION OF THE DRAWINGS

FIG. 1 is a partial axial sectional view of a thermocouple column and reactor vessel head penetration showing seals formed by prior art methods.

FIG. 4 is a partial axial sectional view of a thermocouple column and reactor vessel head penetration showing seals formed by the method according to the invention.

DESCRIPTION OF THE PREFERRED EMBODIMENT

Figure 2:
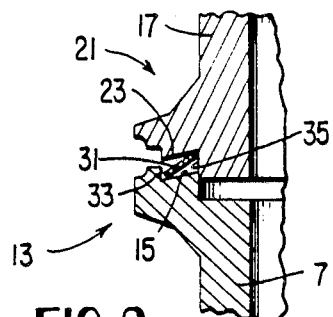
FIG. 2 is an axial sectional view of a separated coupling employing a seal of a type which is used in the prior art shown in FIG. 1 and in the method according to the invention as shown in FIGS. 4 to 6.

Referring to FIG. 1 of the drawings, a thermocouple column 1 is shown sealed to a reactor vessel head penetration 3 according to prior art methods. The reactor vessel head penetration 3 is part of the closure head (not shown) which is removably sealed to a nuclear reactor pressure vessel (not shown) in a known manner. The closure head of the reactor vessel is provided with a plurality of reactor vessel head penetrations, one for each of a plurality of thermocouple columns which penetrate the closure head for providing a sealed passage for various leads and control apparatus shown generally at 5 which must pass from the exterior to the interior of the reactor vessel.

A female flange 7 has a lower axial end portion 9 which is permanently joined to the reactor vessel head penetration 3 by a full circumferential weld 11. Female flange 7 has an upper axial end portion 13 which is provided with a shoulder 14 having an annular abutment surface 15. A male flange 17, which has an opening 19 penetrated by the thermocouple column 1, has a lower axial end portion 21 provided with a shoulder 22 having an annular abutment surface 23 which is axially adjacent annular abutment surface 15. Male flange 17 is provided with an upper axial end portion 25 which has an inner surface provided with an annular abutment surface 27. Thermocouple column 1 has a further annular abutment surface 29 which is machined on its circumference and which is arranged to be axially adjacent the annular abutment surface 27. The adjacent pairs of annular abutment surfaces 15, 23 and 27, 29, respectively, are each arranged to define a space therebetween in which an annular, deformable, metal gasket (not shown in FIG. 1) is placed for the formation of a seal between the female flange 7 and male flange 17 and between male flange 17 and thermocouple column 1.

FIG. 2 shows an enlarged coupling section corresponding to a portion of the sectional view in FIG. 1 in the area of the upper axial end portion 13 of female flange 7 and the lower axial end portion 17 of male flange 17. In order to facilitate the explanation of the sealed coupling which is formed when the abutment surfaces 15 and 23 are compressed together, FIG. 2 shows the female and male flanges in the separated state prior to being torqued together, with an annular, deformable, metal gasket 31 disposed between the abutment surfaces.

As shown in FIG. 2 annular abutment surfaces 15 and 23 each have a frustro-conical shape with the same cone angle. A flange lip 33 provided on female flange 7 forms a V-shaped recess with abutment surface 15 for receiving the outer annular edge of gasket 31. Similarly, a flange lip 35 provided on male flange 17 forms a V-shaped recess with abutment surface 23 for receiving the inner annular edge of gasket 31. Each abutment surface 15 and 23 is angled with respect to an imaginary vertical line in FIG. 2 by approximately 10°. As can be seen, the initial gasket angle is greater than the angles of the abutment surfaces 15 and 23. This is due to the distance between the flange lips 31 and 35 being slightly less than the radial sectional height of the gasket 31. As the abutment surfaces 15 and 23 are compressed together against the gasket 31, the gasket begins sealing radially against the flange lips as the inclined abutment surfaces are brought to bear against the gasket sides to prevent gasket column buckling. A plastic flow condition is induced on the sealing edges of the gasket to form a substantially 100% metal-to-metal seal. A metal seal which can be used for seal 31 is obtainable from the Aeroquip Corporation, Marman Division, Los Angeles, Calif. under the trademark Conoseal.

Figure 3:
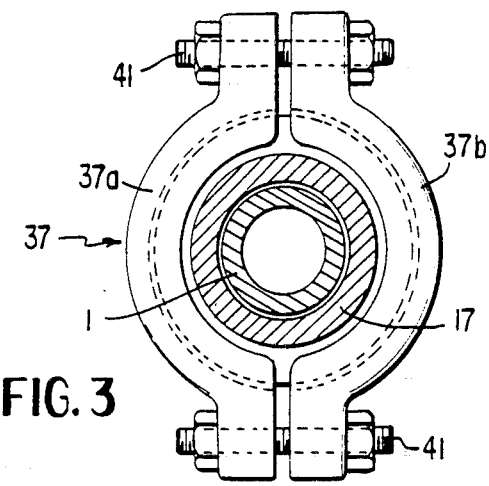
FIG. 3 is a sectional view along line 3—3 in FIG. 1.

Referring to FIGS. 1 and 3, a segmented yoke 37 is utilized in accordance with the known method for compressing annular abutment surfaces 15 and 23 together. As shown in FIG. 1, the yoke 37 has a frustroconical shaped recess 39 which matches the combined outer contour presented by the shoulders 14 and 22 of female flange 7 and male flange 21, respectively. The yoke 37 comprises two segments 37a and 37b which are connected together by tangentially oriented bolts 41. When the yoke 37 is placed in position, the bolts 41 may be tightened, pulling the two segments 37a and 37b together, pinching the abutment surfaces 15 and 23 together against gasket 31 (FIG. 2) to form the seal as described above and as shown in FIG. 1.

A similar seal is formed between the abutment surface 27 of male flange 17 and abutment surface 29 of the thermocouple column 1. This seal also employs a Conoseal type of gasket (not separately visible in FIG. 1) which is compressed between the respective abutment surfaces 27 and 29.

In this case, however, the axial force for compressing the abutment surfaces 27 and 29 against the gasket is provided by axially oriented bolts 43 which are disposed in threaded bores 45 of a donut shaped piece 47 surrounding the thermocouple column 1. Piece 47 has an inner annular recess 49 for accommodating the two halves of a split ring 51 which is further accommodated by an outer annular recess 53 machined into the outer surface of thermocouple column 1.

Bolts 43 each have a lower end 55 which bear against a ledge 57 of male flange 17 as bolts 43 are tightened. The tightening of bolts 43 causes donut shaped piece 47 to move upwardly, causing split ring 51 to bear against a radial surface 58 forming the upper surface of outer annular recess 53. Such action pulls the thermocouple column 1 upwardly and pushes male flange 17 downwardly, thus compressing the annular abutment surfaces 27 and 29 together against the gasket therebetween until a seal is formed.

Experience has shown that seals formed in accordance with the prior art techniques described in connection with FIG. 1 deteriorate relatively rapidly, which requires that the bolts 41 through segments 37a and 37b and the bolts 43 through donut piece 47 be routinely tightened in order to minimize leakage through the respective seals.

A thermocouple column which is sealed with respect to a reactor vessel head penetration in accordance with the method of the present invention and which avoids the maintenance problems associated with the prior art methods described above is illustrated in FIGS. 4 to 6.

Referring to FIG. 4, there is illustrated a thermocouple column 101 which extends through the same reactor vessel head penetration 3 as illustrated in FIG. 1. A female flange 103 has a bore 105 through which the thermocouple column 101 passes and a lower axial end portion 107 which is permanently connected to the reactor vessel head penetration 3 by a full circumferential weld 109. At its upper axial end portion 111 female flange 103 has a first annular recess 113 separated by a radial shelf 114 from a second annular recess 115 which has a smaller diameter than that of the first inner annular recess 113. At its inner radius shelf 114 presents an abutment surface 119.

A male flange 121 which has a bore 123 through which the thermocouple column 101 passes, is provided with a lower axial leg 125 which is accommodated by the space between the inner annular recess 115 and thermocouple column 101. Male flange 121 is further provided with an annular projection 127 which presents an upper radial bearing surface 129. Projection 127 has a lower radial surface axially opposite the bearing surface 129 which is provided with an annular abutment surface 131. Annular abutment surface 131 is axially adjacent annular abutment surface 119 and defines therewith an annular space (not shown in FIG. 4) in which a deformable annular metal gasket 133 is disposed (See FIG. 5). The inner axial surface of female flange 103 which forms the inner annular recess 113 is provided with threads for receiving a locknut 135 having a radial bearing surface 137 adjacent the bearing surface 129 provided on projection 127. Female flange 103 is further provided with a gripper groove 138 having a radial bearing surface 139 for receiving a member used for applying an axial compression force to the abutment surfaces 119 and 131 as will be described below in connection with FIG. 5.

At the upper axial end of the male flange 121 as shown in FIG. 4 there is provided a radial ledge 140 and an inner annular recess 141 provided with threads for receiving a locknut 143. Below the threaded recess 141 male flange 121 is provided with an inwardly projecting shoulder 145 which has an annular abutment surface 147. Abutment surface 147 is positioned to be axially adjacent a corresponding annular abutment surface 149 which is provided on the thermocouple column 101. A deformable metal gasket (not shown in FIG. 4) is located between the abutment surfaces 147 and 149 and forms a seal therebetween upon the application of an axial compressive force which presses the abutment surfaces 145 and 147 together. Locknut 143 is provided with an annular cup shaped recess 151 for receiving a split ring 153 having an upper radial bearing surface 155. Thermocouple column 101 is appropriately machined to form an annular projection 157 having a lower bearing ledge 159 and to form a gripper groove 160 which has an upper radial bearing surface 161 and which receives a bearing member which is used to apply an upward axial force to the thermocouple column 101 via the radial bearing surface 161 as will be described in connection with FIG. 6.

Figure 5:
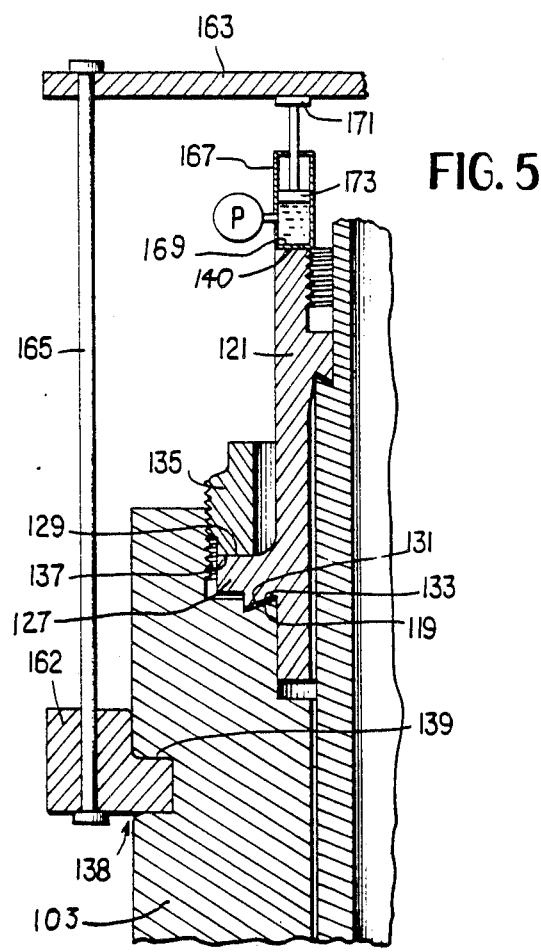
FIG. 5 is an enlarged view of a portion of FIG. 4 and additionally illustrating in schematic form the manner in which an external force is applied to form one of the seals according to the method of the invention.
Figure 6:
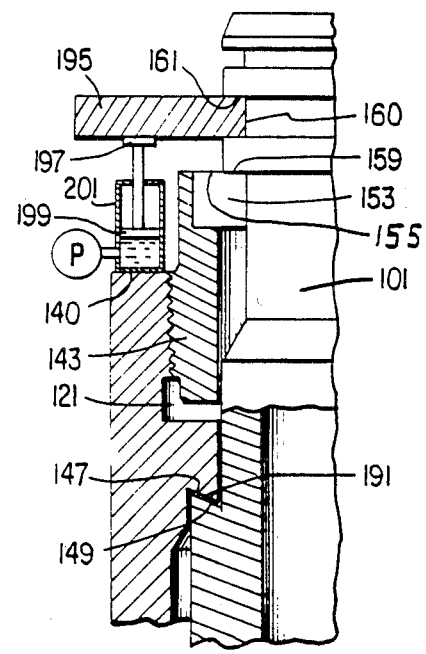
FIG. 6 is an enlarged view of another portion of FIG. 4 and additionally illustrating in schematic form the manner in which an external axial force is applied to form another of the seals in accordance with the method of the invention.

The application of the axial compressive forces to the respective pairs of annular abutment surfaces 119, 131 and 147, 149 for forming the seals in accordance with the method of the invention can best be understood by reference to FIGS. 5 and 6.

FIG. 5 illustrates in schematic form the application of the axial compressive force to the abutment surfaces 119 and 131 for forming a seal therebetween. A Conoseal type gasket 133 is placed on top of abutment surface 119 prior to locating male flange 121 in the position shown. The abutment surfaces 119 and 131 and the gasket 133 are configured and have the same relative dimensions and inclinations as discussed in connection with FIG. 2 and thus form the same type of seal.

A hydraulic jack arrangement is provided for applying a downward axial force against the bearing ledge 140 of male flange 121 and an upward axial force against the radial bearing surface 139 of gripper groove 138. For this purpose the hydraulic jack arrangement includes a bearing member 162 which engages gripper groove 138 and which is connected to an upper pressure plate 163 via a connecting member 165. A hydraulic jack 167 has one end 169 resting on the bearing surface 140 of male flange 121 and has a pressure applying member 171 connected to a hydraulic piston 173 for applying pressure to the pressure plate 163. Any other suitable mechanism for applying such an external axial compressive force may be used in accordance with the method of the invention. The axial forces applied to the bearing surface 139 of the gripper groove 138 and to the bearing ledge 140 of male flange 121 are transferred to the respective abutment surfaces 119 and 131 for compressing the annular deformable metal gasket 133 to form a seal. In accordance with the invention, while the axial compressive forces are being applied, the locknut 135 is tightened so that the bearing surface 137 of locknut 135 bears against the corresponding bearing surface 129 of projection 127. Locknut 135 in combination with projection 127 thus immobilizes the male flange 121 with respect to the female flange 103. Locknut 135 is sufficiently tightened so that upon the removal of the axial compressive forces provided by the hydraulic arrangement, sufficient compressive forces are retained at the gasket 133 to maintain the integrity of the seal.

FIG. 6 schematically illustrates how the seal is formed between the abutment surface 147 and abutment surface 149 of the male flange 121 and thermocouple column 101, respectively. A deformable metal gasket 191 of the Conoseal type is placed between the abutment surfaces 147 and 149 during assembly of the male flange on to the thermocouple column 101. The abutment surfaces 147 and 149 and gasket 191 are also configured to have the same relative dimensions and inclinations as described in connection with FIG. 2 for forming the same type of seal.

In order to compress the abutment surfaces 147 and 149 together against the gasket 191 to form the seal, a downward axial force is applied against the bearing ledge 140 of male flange 121 and an upward axial force is applied against the upper radial surface 161 of the gripper groove 160 in the thermocouple column. A suitable mechanism, for example a hydraulic arrangement which is schematically illustrated in FIG. 6 may be used to apply these axial forces. For example, a bearing member 195 which is constructed for engaging the gripper groove 160 in the thermocouple column 101 may be arranged to cooperate with a pressure applying member 197 which is connected to the piston 199 of a hydraulic jack 201 which rests on the bearing ledge 140 of male flange 121. The axial forces applied to the bearing ledge 140 of male flange 121 and to the radial bearing surface 161 of the gripper groove 160 are transferred to the respective abutment surfaces 147 and 149 for compressing and deforming the gasket 191 to form a seal as previously discussed. When the seal is formed the locknut 143 is tightened to cause the upper bearing surface 155 of split ring 153 to bear against the bearing surface 159 in order to immobilize the male flange 121 and the thermocouple column 101 relative to one another. Again, the locknut 143 is sufficiently tightened so that upon removal of the external axial force applied by the hydraulic jack arrangement there will remain sufficient compressive forces at the area of the gasket 191 in order to retain the integrity of the seal.

The formation of a Conoseal type of seal by the application of an external axial force and immobilizing with respect to one another the parts being sealed together prior to removal of the external axial force as described in connection with FIGS. 5 and 6, has been found to result in a seal which does not deteriorate as quickly as a similar seal formed in accordance with the prior art methods, and thus requires less maintenance than the seal formed by the prior methods.

Seals formed in accordance with the method of the present invention have the further advantage that the parts being sealed together can be easily released by re-application of the external axial force and loosening the respective locknuts. The seals can be re-formed by simply replacing the deformable gasket with a fresh gasket and repeating the steps of the method described in connection with FIGS. 5 and 6.

It will be understood that the above description of the present invention is susceptible to various modifications, changes and adaptations, and the same are intended to be comprehended within the meaning and range of equivalents of the appended claims.

I claim:

1. A method for forming a sealed coupling between two bodies, each body presenting an annular abutment surface, the respective bodies being arranged so that their respective annular abutment surfaces are axially adjacent one another, defining a space therebetween, wherein a deformable gasket is disposed within the space, said method comprising:
providing one of the bodies with an annular projection;
providing the other body with threads for receiving an annular locknut which can be tightened to bear against the annular projection of the one body;
applying an external axial force to the bodies for compressing the abutment surfaces together against the gasket to form a seal between the bodies;
immobilizing the bodies relative to one another while the external force is being applied to the bodies by hand-tightening an annular locknut via the threads of the other body until the locknut abuts the annular projection of the one body, substantially preventing relative axial movement between the bodies when the external axial force is withdrawn; and
withdrawing the external axial force applied to the bodies, leaving the two bodies coupled together via the seal.

* * * * *